Figure 1:
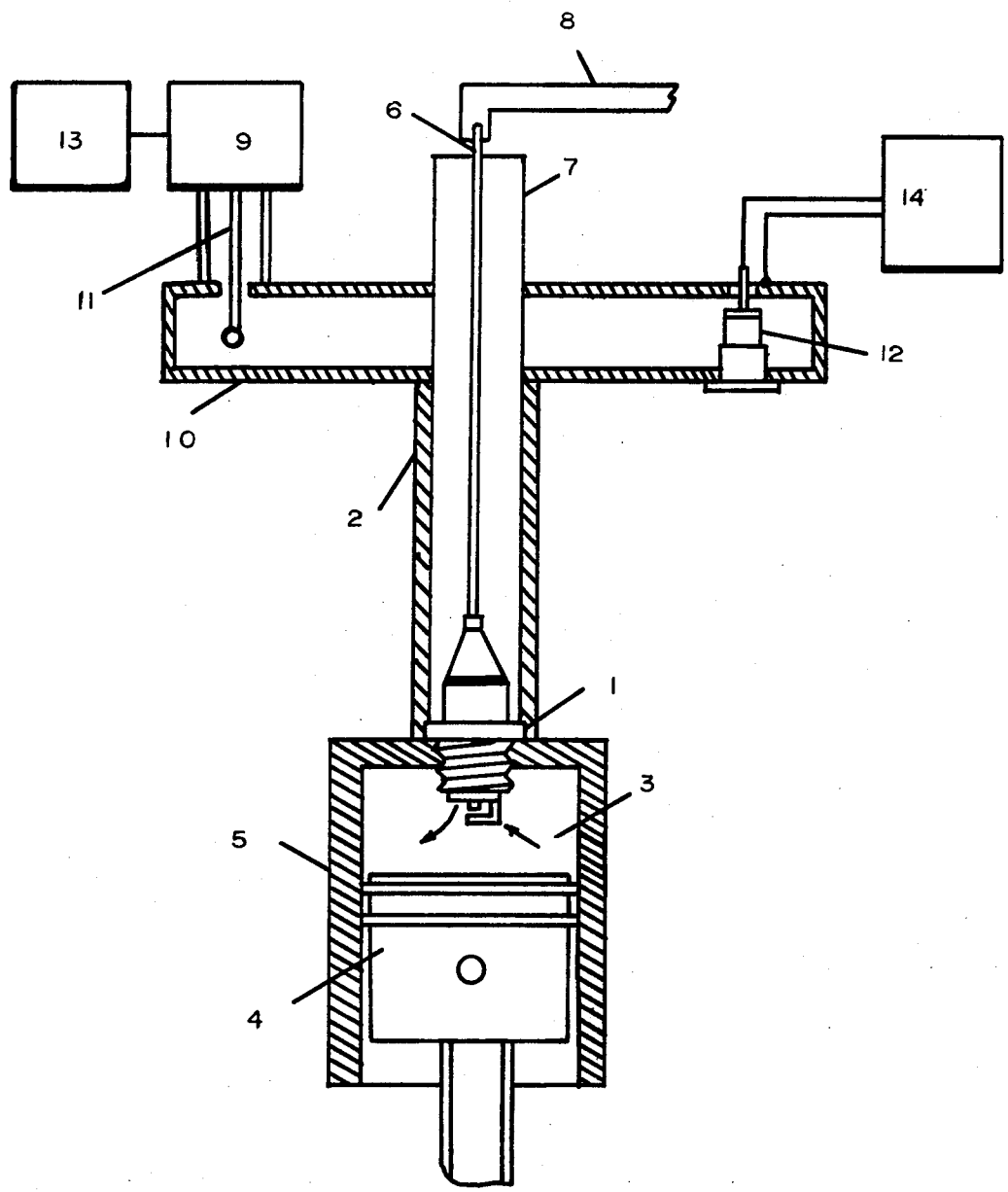

United States Patent

Merlo

[15] 3,703,825
[45] Nov. 28, 1972

[54] COMBUSTION MICROWAVE DIAGNOSTIC SYSTEM

[72] Inventor: Angelo Louis Merlo, 2115 East Long Lake Road, Troy, Mich. 48084

[22] Filed: April 27, 1971

[21] Appl. No.: 137,780

Related U.S. Application Data

[63] Continuation-in-part of Ser. No. 764,566, Oct. 2, 1968, Pat. No. 3,589,177.

[52] U.S. Cl. ..................................73/116, 324/58.5 C
[51] Int. Cl. .............................................G01m 15/00
[58] Field of Search................73/116, 35; 324/58.5 C

[56] References Cited

UNITED STATES PATENTS 2,959,732   11/1960   Linberg, Jr............73/116 UX
2,951,473    9/1960   Bodine...................73/116 UX

*Primary Examiner*—Jerry W. Myracle

[57] ABSTRACT

Methods to resonate the combustion chamber of internal combustion engines at radio frequencies, for the purpose of bottom dead center measurement at all available engine rpm are disclosed. Methods to employ the Q value of radio frequency resonances in combination with electron producing standard fuels for mechanical and electrical measurements within and near the combustion chamber, at all available rpm, are also disclosed. The basic system employed in the measurements comprises a turnable source of coherent radio frequency energy and a hybrid transmission line to convey the radio frequency energy into the combustion chamber. It is also used to detect the energy reflected back from the combustion chamber. The method for detecting bottom dead center requires changing the transmitted frequency so that a resonance occurs at precisely the maximum displacement of the piston during it's stroke. The method for determining the properties of materials requires a comparison between the Q value with standard electron producing fuel and the Q value of the ingredients in question.

7 Claims, 3 Drawing Figures

INVENTOR
Angelo Louis Merlo

INVENTOR
Angelo Louis Merlo

COMBUSTION MICROWAVE DIAGNOSTIC SYSTEM

This invention is a Continuation-in-part of my application, Ser. No. 764,566 filed Oct. 2, 1968, now U. S. Pat. No. 3,589,177.

This invention relates to a diagnostic system for the combustion chamber of internal combustion engines, and to means for using electromagnetic radiant energy in the ultra high and microwave frequency range to sense and measure the movement and behavior of parts as well as combustion phenomenon within the combustion chamber during high speed operation of engines. In more particular it relates to a novel method to detect the time of bottom dead center of the piston stroke of an internal combustion engine by means of a microwave resonance and it also relates to methods to employ resonances to study ingredients that develop during the combustion process.

The combustion chamber of an internal combustion engine is a hot and hostile environment and previous methods to perform dynamic measurements within the combustion chamber during high speed engine operation have necessitated the use of elaborate and carefully adjusted equipment. In certain cases it has been necessary to modify the engine in order for experiments to be performed, therefore past methods have not gained widespread use.

It is an object of this invention to provide a convenient means to measure the high speed chemical ionization reactions taking place during the combustion cycle by employing the Q value of resonances, without modifications to engines.

Another object of this invention is to provide means to utilize the electromagnetic energy resonance phenomenon within the combustion chamber to monitor high speed mechanical displacements.

Another object of this invention is to provide the means whereby high speed moving parts within the combustion chamber may be tracked electronically by employing the electromagnetic energy resonances.

Another object of this invention is to provide, through the use of resonances, the means to measure the time of Bottom Dead Center and by the employment of this measurement the means also to measure the time of Top Dead Center during high speed engine operation.

Another object of this invention is to provide the methods for reference standards of microwave resonance measurements by employing standard electron producing tracer fuels in the combustion chamber.

Other objects and advantages of the invention will become apparent from the following detailed description taken in connection with the accompanying drawings, in which:

FIG. 1 — is a general diagram of the apparatus.

Figure 2A:
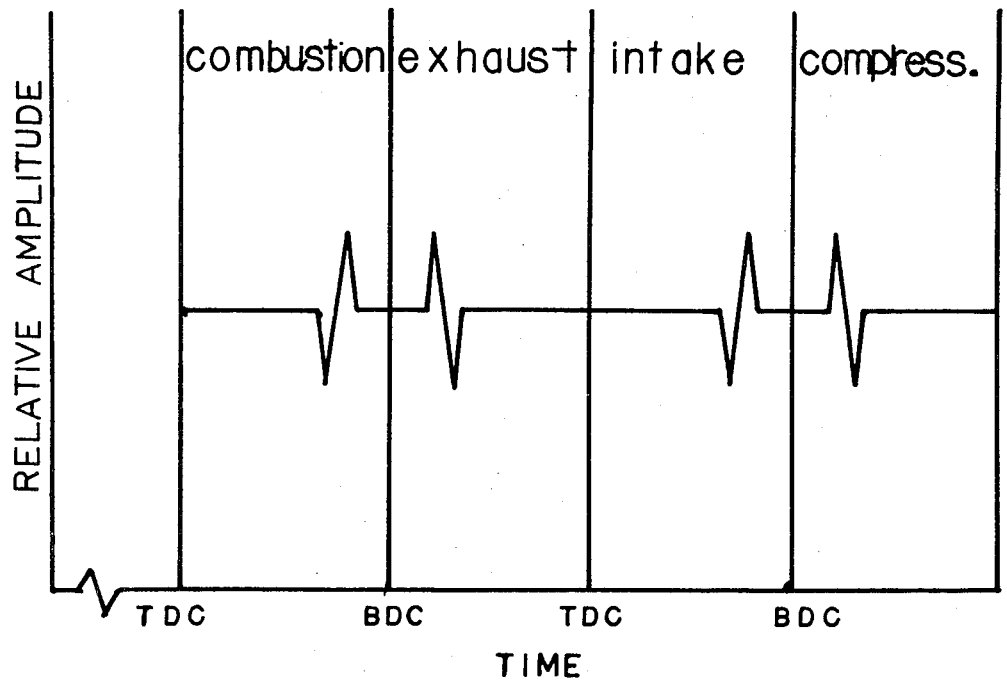

FIG. 2A — shows the nature of the microwave video detected resonance at low excitation frequency.

Figure 2B:
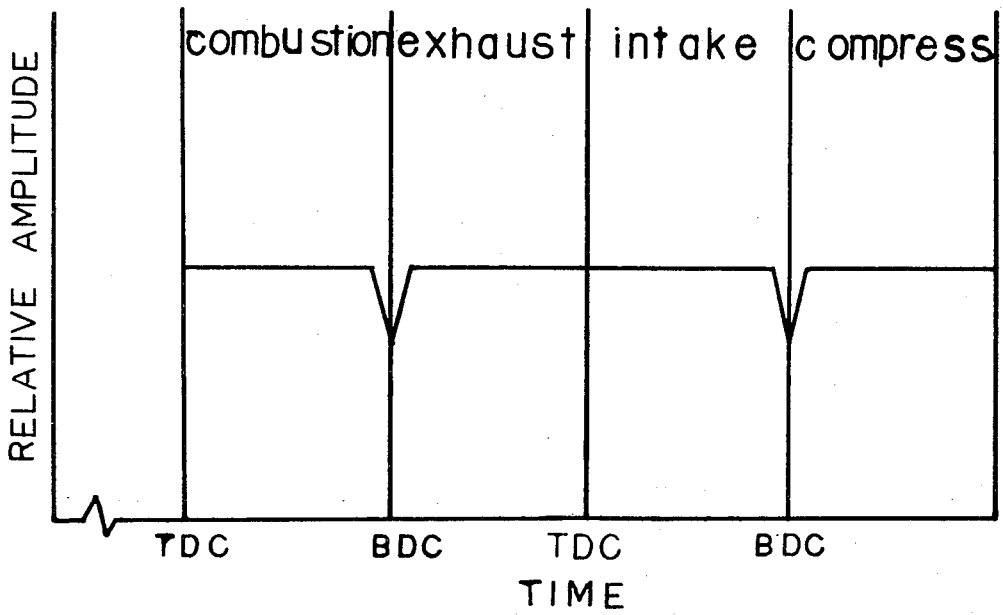

FIG. 2B — shows the nature of the microwave resonance when occurring at the turn around point at the bottom of the piston stroke corresponding to maximum piston displacement.

While the invention is susceptible of various modifications and alternative arrangements, I have shown in the drawings and will herein describe in detail the preferred embodiments. It is to be understood, however, that I do not intend to limit the invention by such disclosure for I aim to cover all modifications and alternative arrangements following within the spirit and scope of the invention as in the appended claims.

FIG. 1 shows a general view of the apparatus. The spark plug 1 is shown enclosed by a cylindrical shield 2 which forms the outer conductor of a coaxial transmission line operating in the TEM mode. The subject of resonances is discussed on page 170 of the book titled "Understanding Microwaves," John F. Rider — Publisher, Victor Young — Author, published in New York. The definition of modes can be found in the "Waveguide Handbook" MIT Rad. Lab. Series Volume 10, edited by N. Marcuvitze, copyright 1951 by McGraw Hill Book Co. Inc., also in the "Microwave Engineers Handbood" published by Horizon House-Microwave Inc., 1961-1962, pages TD-25 to TD-32, and also pages TD-74 and TD-75. Electromagnetic energy passes through this coaxial line in the process of entering the combustion chamber 3 which is a cylindrical enclosure forming an electromagnetic wave cavity. This cavity, which is also the combustion chamber, is turnable by virtue of the motion of the piston 4 within the cylinder wall 5. The coaxial transmission line having cylindrical outer conductor 2 in FIG. 1 utilizes a low loss dielectric filling between the outer 2 and inner 6 conductor. This dielectric filling is exposed 7 at the top end and forms an effective ignition spark insulator to ground for the ignition lead 8. Electromagnetic energy generated by the source 9 enters a rectangular waveguide section 10 through the coax to waveguide adapter 11. This energy moves within the waveguide section 10 to the coax section 2. A portion also passes beyond coax section 2 to the electromagnetic energy detector 12 to bias this device into it's most sensitive operating range. A very small portion escapes through insulator 7. The portion which escapes through insulator 7 is minimized by construction of this part of the coax section to have a high impedance to the flow of energy. This is accomplished by increasing the ratio formed by the outer diameter of the coax divided by the diameter of the center conductor 6. In FIG. 1 the electromagnetic energy source 9 has been selected to be a reflex klystron, this invention is not restricted to this type of electromagnetic energy source. The reflex klystron, however, is a convenient source for frequency and amplitude types of modulation through the klystron power supply 13 which supplies biasing potentials to the klystron 9.

As the piston moves up and down within the cylindrical chamber 5, predictable electromagnetic energy resonant absorptions occur. These absorptions appear at the detector 12 as amplitude variations of detected energy. As the piston 4 proceeds from the extreme top of the stroke towards the extreme bottom of the stroke, absorptions due to the $TE_{111}$, $TM_{011}$, $TE_{010}$ etc. modes appear according to a well established theory concerning this electromagnetic phenomenon. The resonances occur for particular positions of the piston, dependent upon the geometry of the chamber, the frequency of the electromagnetic energy and the dielectric constant and loss tangent of the dielectric materials existing within the chamber 3. Properties of the dielectric material existing in the chamber and interacting with the resonance can be determined by measuring the Q of the resonance. This technique is described, for example, by F. Horner et al., "Resonance Method of Dielectric Measurement at Centimeter Wavelengths." J. IEE, volume 93, Pt. III pp. 53–58, January 1946. The use of this technique was disclosed in connection with the resonances excited within combustion chambers of internal combustion engines in a paper presented at the 2nd Annual Transducer Conference held at the National Bureau of Standards, Gaithersburg, Md. on May 5, 1970, and published in the IEEE Transactions on Industrial Electronics and Control Instrumentation April 1970 volume IECI–17 Number Two, which first became available to subscribers on May 4, 1970, the first day of the meeting. The title of the presentation and the subsequent publication is "Combustion Chamber Investigations By Means of Microwave Resonances" by the applicant of this invention.

The absorptions within the combustion chamber 3 appear as variations in the voltage at the detector 12. The pre-amplifier 14 is utilized to increase the magnitude of the voltage which appears from the detector and also to institute filtering of the signals that appear from the detector with regards to the frequencies which are magnified and which are permitted to pass.

FIG. 2A shows the character of a typical resonance, the $TE_{111}$, as it can be observed using an oscilloscope connected to the output of the pre-amplifier 14 during the operation of the engine.

The position of occurrence in time of the resonance with respect to the time of occurrence of top dead center is determined by the geometry of the cylinder, the frequency of the exciting energy and the contents of the combustion chamber. The same argument holds for the time of occurrence of bottom dead center. The phase of the absorption signal with respect to time, as seen by the oscilloscope depends upon the direction of travel of the piston. If the resonance occurs displaced in time from the time of bottom dead center of the piston travel, 180 degree phase reversals exist in the resonance between ascending and descending directions of piston travel. Observation of the phase of the resonance is therefore indicative of the direction of piston motion. The time of occurrence of the resonance with respect to the time of occurrence of bottom dead center can be shortened by decreasing the radiated frequency. As the magnitude of the of the radiated frequency is reduced, a value of frequency will be reached in which the piston can no longer change the dimensions of the combustion chamber sufficiently to move completely through the resonance. This condition is shown by FIG. 2B. The combustion chamber therefore remains in the resonant condition as the piston proceeds around bottom dead center. If the Q value of the resonance is high, the resonance will occupy very small increments of piston displacement. The smaller the increment in piston displacement occupied by the resonance the greater will be the resolving power of this technique to detect small changes in the displacement of the piston. When the frequency is selected to cause the resonance to occur at bottom dead center and the Q value is high, the time of occurrence of bottom dead center can be determined with accuracies corresponding to better than one degree of angular piston displacement.

The magnitude of the Q of the resonance is indicative of the number of charged particles existing within the combustion chamber during the time that the resonance is occurring. A high Q, representing a resonance occupying small increments of angular piston displacement, results when a minimum of charged particles exist within the resonating combustion chamber. The resonances excited within a combustion chamber in the absence of fuel and ignition is a reference condition for the measurement of the number of existing charged particles. The addition of fuel containing Cesium or other electron producing ingredients in calibrated quantities serves as another means to determine the number of charges being measured by the resonances.

What is claimed to be new, novel and inventive by this disclosure is as follows

I claim:

1. The method of measuring the time of occurrence of bottom dead center of the angular displacement of the piston of an internal combustion engine at all available rpm comprising the steps of generating an externally controlled ultra high and microwave radio frequency wave, radiating said wave into the combustion chamber of said engine, detecting a resonance of said wave reflected from said chamber, changing the wavelength of said wave to cause the overlap in time of the selected resonance mode excited by the piston moving in the "down" direction with said same mode excited by said piston moving in the "up" direction, time of said overlap then being coincident with the time of bottom dead center, and essentially placing said resonance at the point of maximum displacement of said piston at its turn around point.

2. The method according to claim 1 wherein the resonance mode employed is the $TE_{111}$ mode, said mode having resonant frequency dependent upon three dimensions, said mode resonating at only one displacement of the piston of internal combustion engines, said mode having electric field perpendicular to axis of cylinder of said engines, said electric field having terminations on charges existing on opposite walls of the cylinder, said mode having conduction currents existing in the walls of said cylinder, said conduction currents traversing said pistons contact with said cylinder wall completing paths to said charges, said electric field surrounded by circular magnetic field.

3. The method according to claim 1 wherein the time of occurrence between successive bottom dead centers is employed to be divided in two, in order to identify the time of top dead center.

4. The method of measuring the number of charged particles within the combustion chamber of an internal combustion engine at all available rpm, comprising the steps of generating an externally controlled coherent ultra high and microwave radio frequency wave into said chamber of said engine, detecting a particular resonance of said wave reflected from said chamber, measuring the Q value of said resonance, comparing said Q value with the Q value of the said resonance excited in the presence of standard fuel containing a calculated predetermined quantity of charged particles.

5. The method according to claim 4 wherein the comparison standard is a combustion chamber containing an absence of any fuel and ignition.

6. The method according to claim 5 wherein the resonance mode is the $TM_{010}$ mode, said mode having constant field strength in two dimensions, said mode having resonant frequency dependent only upon one dimension, said dimension being the radius of the cylinder, said mode remaining in resonance throughout all values of displacement of the piston of internal combustion engines, said mode having electric field coincident with the axis of the cylinder of said engines, said electric field having terminations on charges existing on center of said piston and also on the opposite end of said cylinder, said mode having conduction currents existing in the walls of said cylinder, said conduction currents traversing said pistons contact with said cylinder wall completing paths to said charges, said axial electric field surrounded by circular magnetic field.

7. The method according to claim 4 wherein the resonance mode is the $TM_{010}$ mode, said mode having constant field strength in two dimensions, said mode having resonant frequency dependent only upon one dimension, said dimension being the radius of the cylinder, said mode remaining in resonance throughout all values of displacement of the piston of internal combustion engines, said mode having electric field coincident with the axis of the cylinder of said engines, said electric field having terminations on charges existing on center of said piston and also on the opposite end of said cylinder, said mode having conduction currents existing in the walls of said cylinder, said conduction currents traversing said pistons contact with said cylinder wall completing paths to said charges, said axial electric field surrounded by circular magnetic field.

* * * * *